United States Patent

Itou

[11] Patent Number: 5,913,008
[45] Date of Patent: Jun. 15, 1999

[54] VIDEO EDITOR AND VIDEO SYSTEM WITH A SCAN CONVERT FUNCTION

[75] Inventor: Katsutosi Itou, Tama-si, Japan

[73] Assignee: Samsung Aerospace Industries, Ltd., Changwon-si, Rep. of Korea

[21] Appl. No.: 08/829,138

[22] Filed: Mar. 28, 1997

[51] Int. Cl.⁶ .............................. H04N 5/93; G11B 27/00
[52] U.S. Cl. .................... 386/52; 386/131; 348/552
[58] Field of Search .................. 386/1, 4, 52, 53, 386/54, 55, 64, 131; 348/446, 448, 552, 584, 598, 722; 360/13

[56] References Cited

U.S. PATENT DOCUMENTS 4,145,715  3/1979  Clever ............................. 358/108
5,206,929  4/1993  Langford et al. ................. 395/159

Primary Examiner—Wendy Garber
Assistant Examiner—Christopher Onuaku
Attorney, Agent, or Firm—Howrey & Simon

[57] ABSTRACT

The video editor in accordance with the present invention comprises a scan converting module, a frame synchronizing module, a video delay module, a mixing/key effect module, a special effect module, a waveform generating module, a superimposing module and a buffer. The video editor with a scan convert module may receive a video signal from various video cameras and an analog RGB signal from various personal computers. A video system using a video editor with a scan converting function is also disclosed. The video system includes one or more video cameras connected to input terminals of the video editor and a display or a recording device connected to output terminals of the video editor.

12 Claims, 2 Drawing Sheets

SCAN·C : SCAN CONVERT MODULE
M/K : MIXING/KEY EFFECT MODULE a # VIDEO EDITOR AND VIDEO SYSTEM WITH A SCAN CONVERT FUNCTION

BACKGROUND OF THE INVENTION

1. Field of the Invention

The present invention relates generally to a video system using video editing technologies, and more particularly to a video editor that combines and otherwise manipulates output signals received from a personal computer with signals received from other video sources and processes these signals according to various special effects editing techniques.

2. Description of the Related Art

Different types of typical video editing techniques currently exist. One technique is referred to as "assemble editing" which assembles each image scene. Another type of technique is referred to as "insert editing" which incorporates a desired picture into a base image. The differences between the assemble editing and insert editing techniques resides in whether or not a control signal used for image recording is combined with a signal which corresponds to the original image. That is, assemble editing records into the video signal a new control signal synchronized with the recorded video signal; whereas insert editing records a video signal synchronized with the already recorded control signal. Similarly, in audio editing, depending on whether or not an audio signal is separately inserted into a video signal, a video editor makes it possible to edit an image conforming to a pre-recorded audio signal, or to edit an existing audio signal according to pre-recorded video images.

Recording media and devices are becoming increasingly diversified in connection with recent advances in multi-media technologies. With this diversification comes a need to edit signals received from conventional video sources, such as video cameras, with computer generated signals which differ from conventional audio/video signals. In order to edit these different types of video signals, a converter is required as well as increased memory storage. However, adding these functions to existing video editors results in the undesirability of increasing costs.

Accordingly, an object of the present invention is to provide a video editor which converts a computer output signal into a video signal consistent with video signal standards and combines these signals for multimedia use.

An object of the present invention is to provide a video editor capable of effects functionality using various video signals received from different sources.

Another object of the present invention is to provide a video editor that includes a mixing module that can mix video signals from a converting module with video signals from various video cameras.

Another object of the present invention is to provide a video editor that mixes an RGB signal received from a computer with a video signal received from a video camera in a desired format so that the combined signals may be edited for multimedia use.

A still further object of the present invention is to provide a circuit for receiving video signals in various formats from different types of computers, converting these various signal formats into standard video signals, and mixing these converted signals.

Another object of the present invention is to provide a video editor that is a low cost alternative to existing video editors.

SUMMARY OF THE INVENTION

The present invention meets the above objectives and avoids the drawbacks of the prior art, by providing a video editor with a scan converting function for multimedia applications.

The video editor in accordance with the present invention receives RGB signals from various kinds of computers and converts these signals to signals consistent with existing video signal standards. The video system processes video signals received from other video sources and provides the capability to combine these signals with the RGB signals. The present invention accomplishes these functions without increasing the costs associated with adding, to current video editor devices, the capability to receive and process alternative types of computer video signals.

The present video editor system includes a converter for converting an output signal received from a computer into a signal consistent with video signal standards, and a mixing module for mixing the signal received from the converter with a video signal received from a video signal source. Converting circuits corresponding to the respective input and output formats of a plurality of different computer types process signals received from a plurality of different computers whose input formats and output formats vary.

The video editor provides editing functions such as frame synchronizing for synchronizing an input video image with an existing image, a preview function for viewing a previous frame image stored in memory, and an audio editing function for editing audio signals. The mixing module mixes, into desirable formats, the video signals from conventional video cameras and the converted signals from various computers, such as a personal computer, in order to satisfy the recent demands for multi-media editing. Each converting circuit corresponds to various video output formats received from different computers by converting the RGB signals received from these computers into standard video signals. One or more video cameras are connected to the input terminals of the video editor and a display or a recording device is connected to the output terminals of the video editor.

The present invention also provides a (p)review function that enables the user to use or output the previous synchronized frames. An audio function enables the user to edit audio signals, such as voice, independent of video signals. A scan converter converts the RGB signals received from a computer source into standard video signals thereby allowing multiple kinds of computer signals having different frequencies and pixel formats to be used with signals from various video sources.

The preferred embodiment of the present invention provides a smaller and lighter video editor that can handle signals received from different kinds of computers without the need for attaching a conventional converter or increased video memory. In this manner, the present invention avoids the additional costs associated with adding these functions to prior art video editors.

DETAILED DESCRIPTION OF THE PREFERRED EMBODIMENTS

The above objects and features of the present invention will be apparent from the following description of the preferred embodiments with reference to the accompanying drawings where like reference numbers indicate like elements.

Figure 1:
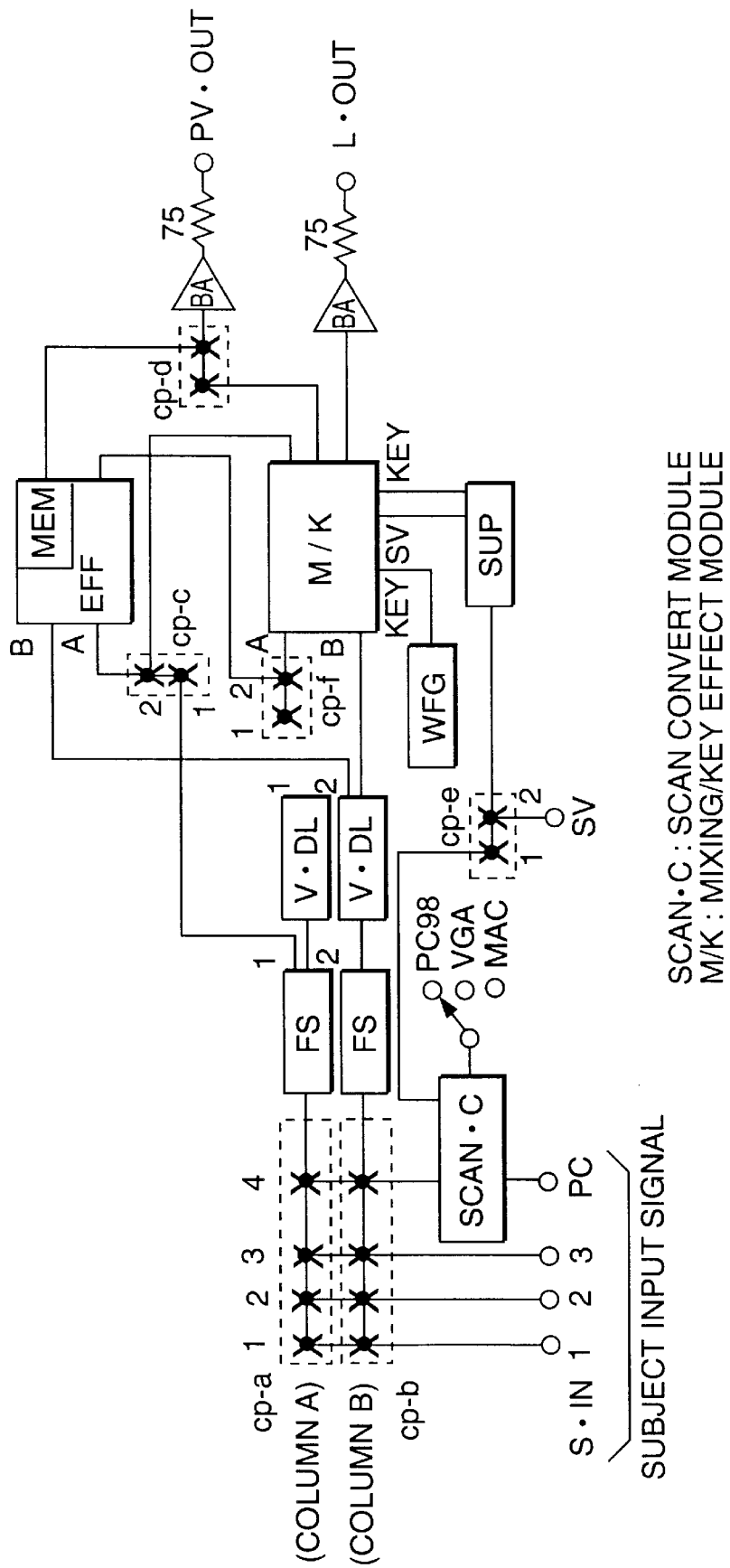
FIG. 1 shows a block diagram of a video editor with a scan converting function according to an embodiment of the present invention.

FIG. 1 generally illustrates video editor 10 including a scan convert module SCAN·C, frame synchronizing modules FS, video delay modules V·DL, a mixing/key effect module M/K, a special effect module EFF including memory storage MEM, a waveform generating module WFG, a superimposing module SUP and a buffer BA. The operation of these modules are selected by the cross point switches CP-a through CP-f which will be described in more detail below.

The video editor 10 receives a VBS signal from various video cameras, such as those cameras used for industrial, business and home use, on input lines S-IN1, S-IN2, and S-IN3. Likewise, scan convert module SCAN·C receives an output RGB signal (non-interlaced) from a computer, such as a personal computer, on input line S-INPC and converts the signal into an EIAJ-RGB, VBS (NTSC) signal or other standard video signal format.

The signals received by the video editor 10 on input lines S-INPC may be created by various types of computers. For example, a PC 98 series of NEC (or Epson, etc.) computers have a horizontal frequency of 24.38 KHz and the number of display pixels of 640 (H)×400(V). IBM PC AT series (VGA) (or PC AT compatibles) have a horizontal frequency of 31.469 KHz and the number of display pixels of 640 (H)×480(V). Macintosh series of Apple Computers have a horizontal frequency of 15.75 KHz and generate a standard signal through an interlaced scanning, such as "frequency conversion", "conversion of non-interlacing into interlacing" and "pixel matching conversion." The scan convert module SCAN·C determines what type of computer video signal is being received on input line S-INPC depending on the type of computer used and appropriately converts the signal into a standard video signal format. By providing a module which both converts and scans input computer signals, both the number and size of the components needed for the video editor in accordance with the present invention are reduced as compared with components of prior video editors.

The frame synchronizing module FS is used to synchronize an image corresponding to the various VBS signals received from the video camera inputs via input lines S-IN1, S-IN2, or S-IN3. Once synchronized, the video signals are input into the video delay modules V-DL which adjusts the phase of the video signals for mixing.

The mixing/key module M/K receives video signals from the converting module SCAN·C, video camera signals received on input lines S-IN1, S-IN2, or S-IN3, and additional signals depending on the type of effect mode invoked. The mixing module M/K mixes the video signals received from the converting module with video signals from various camera sources via the video delay modules V-DL. For example, the mixing/key effect module M/K receives the synchronized video signals from the video delay modules V·DL and can generate a wipe effect when a wipe signal is received through a key effect from the waveform generating module WFG, or it can generate a superimposed effect when a superimpose (super key) signal is received from a superimposing module SUP. These and other effect modes will be more fully described below.

The special effect module EFF generates a special effect and comprises an internal frame memory MEM so that the previous scene information can be stored in the frame memory MEM and used by the video editor or output by the selection of a preview function. The buffers BA receive signals from the mixing module M/K and function as an output amplifier to generate a signal that can drive a 75 ohm coaxial cable.

The video editor 10 in accordance with the present invention provides the following video effects, however, additional effect modes are envisioned as the skilled artisan will appreciate. The video editor 10 provides: a FREEZE effect which is a process of converting a moving picture into a still picture; a MOSAIC effect which is a process for gradating a desired portion of a video signal by using a gradation of the mosaic; a PAINT effect which is a process of roughening pictures similar to an oil painting; a PIP (Picture In Picture) effect which is the process of inserting a new picture into an original picture; a SUPERIMPOSE effect which is a process of inserting characters in a picture; a MIXING effect which is a process for mixing two video signals; a WIPE effect which is a process that divides two signals according to a key signal, and shifting the boundary of the pictures produced. Each of these effect modes as well as other editing functions provided by video editor 10 can be automatically performed, for example, by a computer or microcontroller.

Referring again to FIG. 1, the cross point switches CP-a through CP-f select the particular signal lines to achieve the various editing effects. Input signals received on input terminals S·IN 1~3 and S-INPC use each of the cross point switches CP-a and CP-b and select columns A and B, respectively. By way of example, when '1' is selected from column A of the cross point switch CP-a and '2' is selected from column B of the cross point switch CP-b, the video editor can be operated as follows:

(a) In the MIXING effect mode, a mixed signal 'A+B' is output through the video output terminal L·OUT (Line Out). Here, signal A is received from input terminal S·IN1 and signal B is received from input terminal S·IN2. These signals are supplied to the mixing/key effect module M/K via the frame synchronizing module FS and the video delay module V·DL. The two signals are mixed in the mixing/key effect module and output via the video output terminals L·OUT and/or PV·OUT.

(b) In the WIPE effect mode, 'A→B' signal is output through the video output terminal L·OUT. Here a signal is received by the video editor from input terminal S·IN1 and is converted into a signal which is received from input terminal S·IN2. These signals are supplied to the mixing/key effect module M/K via the frame synchronizing module FS and the video delay module V·DL. If the waveform generator WFG provides the mixing/key effect module M/K with a wave signal, two video signals are converted into a mixed image and output through the video output terminals L·OUT and/or PV·OUT.

(c) In the special effect modes 'EFF', the FREEZE, MOSAIC, PAINT, PIP, SUPERIMPOSE, MIXING and WIPE effects may be selected, and the corresponding effect signals are generated by the video editor 10. For example, a signal from input terminal S·IN1 is transmitted to the mixing/key effect module M/K via the frame synchronizing module FS and the special effect module EFF. An additional signal received from input terminal S·IN2 is also supplied to the mixing/key effect module M/K via the frame synchronizing module FS and the video delay module V·DL. The two signals are processed in special effects mode and the output signal is transmitted through the video output terminals L·OUT and/or PV·OUT.

(d) In the special effect modes 'EFF', when the PIP effect is selected, a signal of the input terminal S·IN1 is supplied to the mixing/key effect module M/K via the frame synchronizing module FS and the special effect module EFF. A signal of the input terminal S·IN2 is supplied to the mixing/ key effect module M/K and the special effect module EFF simultaneously, via the frame synchronizing module FS and the video delay module V·DL. The two video signals are processed to provide the PIP effect and an output signal is transmitted through the video output terminals L·OUT and/ or PV·OUT.

(e) When the cross point switches CP-a and CP-b is selected '4' as the input to the video editor, the output of a personal computer is used. For example, a signal of the subject input terminal S·IN1 and a signal of the subject input terminal S·IN2 are supplied to the mixing/key effect module M/K via the frame synchronizing module and the video delay modules V·DL. If cross point switches CP-a and CP-b are selected as 4, a signal of the input terminal S·INPC is supplied to the mixing/key effect module M/K via the scan convert module SCAN·C and the superimpose module SUP. Then, the two video signals from the video delay modules V·DL are mixed with the signal from the personal computer via the superimpose module SUP and the mixed output signal is transmitted through the video output terminals L·OUT and/or PV·OUT.

(f) The superimpose module "SUP" mixes characters with the composed video signals. After the video signals are mixed in the mixing/key module M/K, particular characters may be combined with these signals via the superimpose module SUP. For example, video signals received on input terminals S·IN1 and S·IN2 are supplied to the mixing/key effect module M/K via the frame synchronizing modules FS and the video delay modules V·DL. A character signal is entered through the super video subject input terminal SV, and then supplied to the mixing/key effect module M/K via the superimpose module SUP. Thus, the two video signals and the character signal are mixed in the mixing/key module and output signal is transmitted through the video output terminal L·OUT and/or PV·OUT.

Figure 2:
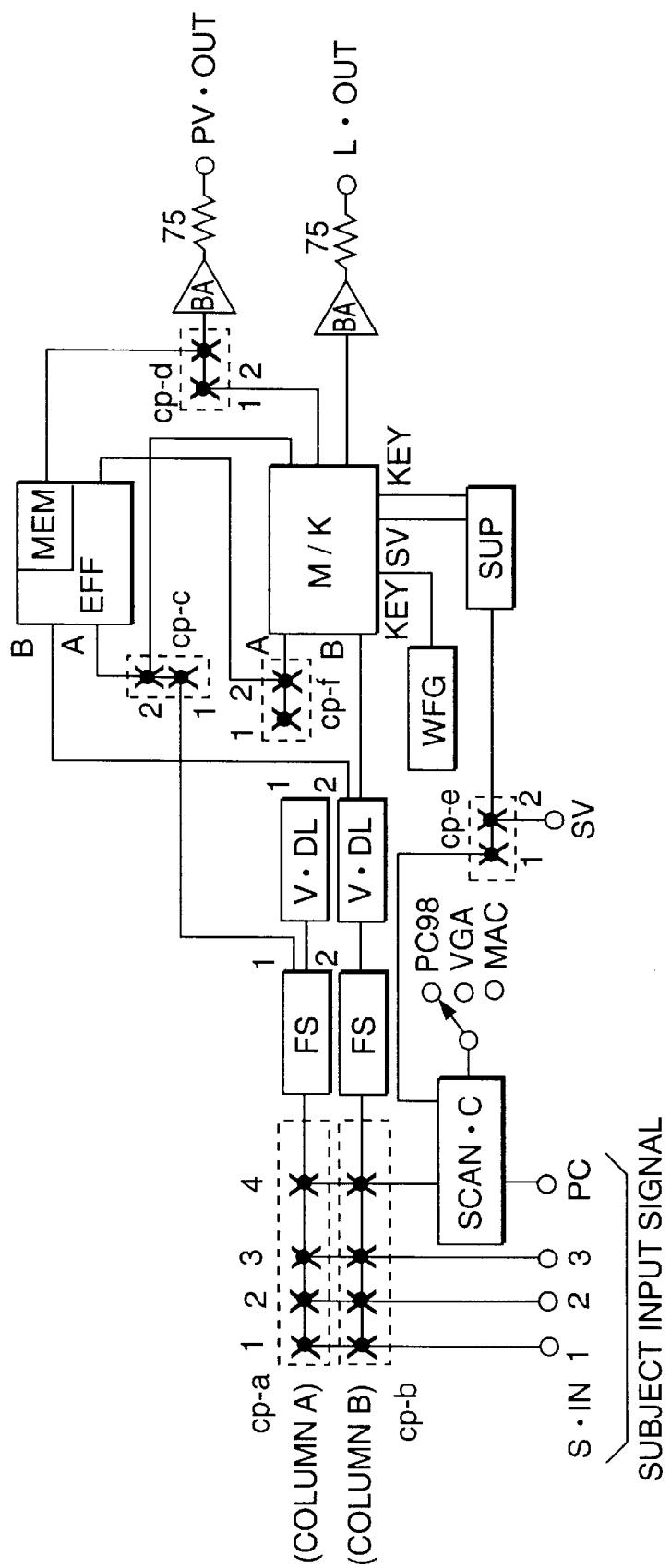
FIG. 2 shows a block diagram of a video editor, especially in a preview mode, according to an embodiment of the present invention.

(g) In the (P)REVIEW' mode, the video signal is output through the video output terminal L·OUT for general editing purposes and is output through the video output terminal PV·OUT for presentation purposes. For example, as shown in FIG. 2, signals of the input terminals S·IN1, S·IN2 are supplied to the mixing/key effect module M/K via the frame synchronizing modules FS and the video delay module V·DL. These two video signals are mixed and the mixed signal is output through the video output terminal L·OUT for a general output. Alternatively, in the PREVIEW mode, the mixed signal of the two video signals received on input terminals S·IN1 and S·IN2 is stored in the frame memory of the special effect module EFF and can be output as a still picture through the video output terminal PV·OUT. Furthermore, the internal memory makes it possible to retrieve the already sent signal (picture) for later presentation.

The present invention may be applied to a video system in which the output of the video editor is connected to a display such as a video monitor, an OHP, or a recording device such as a VTR.

While the present invention has been particularly shown and described with reference to a preferred embodiment thereof, it will be understood by those skilled in the art that various changes in form and details may be made therein without departing from the spirit and scope of the present invention as defined in the appended claims.

What is claimed is:

1. A video editor comprising:
    at least one computer source, each computer source outputting a signal in a computer video output format;
    at least one video input, each video input receiving a video signal;
    at least one frame synchronizing module, each frame synchronizing module coupled to each video input and receiving a video signal therefrom;
    at least one video delay module, each video delay module coupled to each frame synchronizing module and receiving said at least one input signal from said at least one synchronizing module;
    a scan converter module coupled to said at least one frame synchronizing module, wherein said scan converter module converts said video signals in computer video output format received from said at least one computer source into a converted video signal consistent with video signal standards; and
    a mixing module coupled to said scan converter module and to said at least one video delay modules for mixing said converted video signal, with the at least one video signals, received from said at least one or more video delay module, and for generating a mixed output video signal in a desired video format.

2. The video editor of claim 1, wherein the video editor receives signals from at least one computer source having different computer output formats, and wherein said scan converter module further comprises:
    a plurality of converting circuits, each corresponding to computer output format; received from each of said compute
    at least one switch connected to each converting circuit for transmitting computer signals from the computer source to a converting circuit, and for each of said computer output signals to the corresponding converting circuit.

3. The video editor recited in claim 2, wherein said at least one frame synchronizing module synchronizes image signals supplied to the video editor from said at least one video input and said at least scan converter module, and wherein said at least one frame synchronizing module outputting synchronized image signals to said at least one video delay module.

4. The video editor as recited in claim 3 further comprising a mixing key module communicating signals from (a) said at least one video delay module, (b) at least one effect module, and (c) said at least one frame synchronizing module, wherein said mixing key module outputs a mixed signal.

5. The video editor as recited in claim 4, wherein said at least one effect module communicates with (i) said at least one video delay module, (ii) said mixing key module and (iii) said at least one frame synchronizing module for previewing a previous image and wherein said at least one effect module includes a memory for storing the previous image.

6. The video editor as recited in claim 1, wherein the video editor has an audio editing function for editing audio signals independent of the video signals.

7. The video editor as recited in claim 1, wherein said at least one video input is connected to a video camera, and wherein an output of the video editor is connected to a display device or a recording device.

8. The video editor as recited in claim 2, wherein said at least one of said video input and computer source input is connected to a video camera and a computer, respectively.

9. The video editor as recited in claim 8 further comprising an output terminal connected to a display device.

10. A video system comprising:
    an editor including a converter that converts a computer output signal received from a computer source into a converted video signal consistent with video signal standards;

at least one video input means, each video input means outputting at least one video signal;

at least one frame synchronizing means, each frame synchronizing means coupled to said at least one video input means for synchronizing said at least one video signal with the converted video signal and for outputting a synchronized image signal to at least one video delay means;

a mixing means for mixing the converted video signal, received from said converting means, with said at least one video signals, received from said at least one video delay means, and for generating a mixed output video signal in desired format; and an output terminal connected to a peripheral apparatus.

11. The video system as recited in claim 10, wherein said peripheral apparatus is a recorder.

12. The video system as recited in claim 10, wherein said peripheral apparatus is a display device.

* * * * *